US012675191B2

(12) United States Patent
Chang et al.

(10) Patent No.: US 12,675,191 B2
(45) Date of Patent: Jul. 7, 2026

(54) SCREEN PROTECTOR PRESENCE DETECTION

(71) Applicant: Google LLC, Mountain View, CA (US)

(72) Inventors: Mark Chang, Brisbane City (AU); Chiayun Kuan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/743,461

(22) Filed: Jun. 14, 2024

(65) Prior Publication Data

US 2025/0110592 A1 Apr. 3, 2025

Related U.S. Application Data

(63) Continuation of application No. PCT/US2023/075574, filed on Sep. 29, 2023.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

| | | |
|---|---|---|
| 9,224,100 B1 | 12/2015 | Chatterjee et al. |
| 11,755,149 B1 | 9/2023 | Maharramov et al. |
| 11,755,154 B1* | 9/2023 | Zhang ..................... G06F 3/044 |
| | | 345/173 |
| 12,333,126 B2 | 6/2025 | Badr |
| 2010/0245258 A1 | 9/2010 | Stewart et al. |
| 2011/0171998 A1 | 7/2011 | Westerman |
| 2013/0176270 A1 | 7/2013 | Cattivelli et al. |
| 2015/0109243 A1* | 4/2015 | Jun ..................... G06F 3/04886 |
| | | 345/174 |

(Continued)

FOREIGN PATENT DOCUMENTS

| | | |
|---|---|---|
| CN | 106775405 A1 | 5/2017 |
| CN | 116661630 A | 8/2023 |

(Continued)

OTHER PUBLICATIONS

Bhati, Divya, "Google Pixel 9 may come with adaptive touch, will help the screen automatically adjust to user's environment", Mar. 13, 2024, 5 pages.

(Continued)

*Primary Examiner* — Stephen T. Reed
(74) *Attorney, Agent, or Firm* — Colby Nipper PLLC

(57) ABSTRACT

Techniques and apparatuses are described that perform screen protector presence detection. In example aspects, an electronic device detects the presence (or absence) of a screen protector based on touch screen data provided by a touch screen during a time period that a user performs a touch-based gesture. With the touch screen data, screen protector presence detection can be performed without the need for additional sensors and without placing manufacturing requirements on the screen protector. Furthermore, this technique can support the detection of a variety of different screen protectors, including screen protectors with different types of materials and thicknesses.

20 Claims, 12 Drawing Sheets

(56)                    References Cited

U.S. PATENT DOCUMENTS

| | | |
|---|---|---|
| 2015/0338960 A1 | 11/2015 | Yumoto et al. |
| 2015/0370411 A1 | 12/2015 | Patel et al. |
| 2016/0291731 A1 | 10/2016 | Liu et al. |
| 2016/0306491 A1 | 10/2016 | Lee et al. |
| 2017/0108961 A1 | 4/2017 | Thorstenson et al. |
| 2017/0116545 A1 | 4/2017 | Johnson et al. |
| 2018/0088786 A1 | 3/2018 | Abzarian et al. |
| 2018/0121052 A1 | 5/2018 | Durojaiye et al. |
| 2019/0018527 A1 | 1/2019 | Barel et al. |
| 2019/0278388 A1 | 9/2019 | Barel et al. |
| 2020/0064960 A1 | 2/2020 | Munemoto |
| 2023/0079491 A1 | 3/2023 | Slassi et al. |
| 2023/0280868 A1 | 9/2023 | Zhang et al. |

FOREIGN PATENT DOCUMENTS

| | | |
|---|---|---|
| JP | 2013114638 | 6/2013 |
| JP | 6420486 B2 | 10/2018 |
| WO | 2023215114 A1 | 11/2023 |

OTHER PUBLICATIONS

Kim, et al., "Hand Grip Pattern Recognition for Mobile User Interfaces", Jan. 2006, 6 pages.

Kuan, et al., "Classification of User Input using System Contextual Information for Grip Suppression", Technical Disclosure Commons—https://www.tdcommons.org/dpubs_series/4634, Oct. 4, 2021, 12 pages.

Kuan, et al., "Grip Suppression using a Machine-Learned Technique", Technical Disclosure Commons—https://www.tdcommons.org/dpubs_series/4018/, Jan. 24, 2021, 9 pages.

Levenson, Hannah, "Touch Heatmaps: The Future Of Mobile App Usability Testing", Retrieved at: https://usabilitygeek.com/touch-heatmaps-mobile-app-usability-testing/—on Sep. 10, 2024, 7 pages.

Lu, et al., "Machine Learning-Enabled Tactile Sensor Design for Dynamic Touch Decoding", Aug. 15, 2023, 9 pages.

Matero, et al., "Identifying Unintentional Touches on Handheld Touch Screen Devices", Jun. 2012, 4 pages.

Rahman, Mishaal, "Here's even more info on four of the most exciting new Android 15 features", Jul. 1, 2024, 13 pages.

Schoon, Ben, "Google Pixel 9 may get 'Adaptive Touch' feature to automatically adjust sensitivity", Mar. 12, 2024, 6 pages.

"How to Enable Screen Protector Mode Google Pixex 7", https://thedroidguy.com/enable-screen-protector-mode-google-pixel-7-1235805, Jun. 25, 2023, 14 pages.

"International Search Report and Written Opinion", Application No. PCT/US2023/075574, Apr. 2, 2024, 13 pages.

"International Search Report and Written Opinion", Application No. PCT/US2024/061959, Jul. 15, 2025, 9 pages.

Anastasov, Aleksandar, "OnePlus Aqua Touch display technology explained: How it works and the issue it solves", https://www.phonearena.com/news/oneplus-aqua-touch-display-technology-explained_id155615, Feb. 29, 2024, 18 pages.

\* cited by examiner

Figure 2:
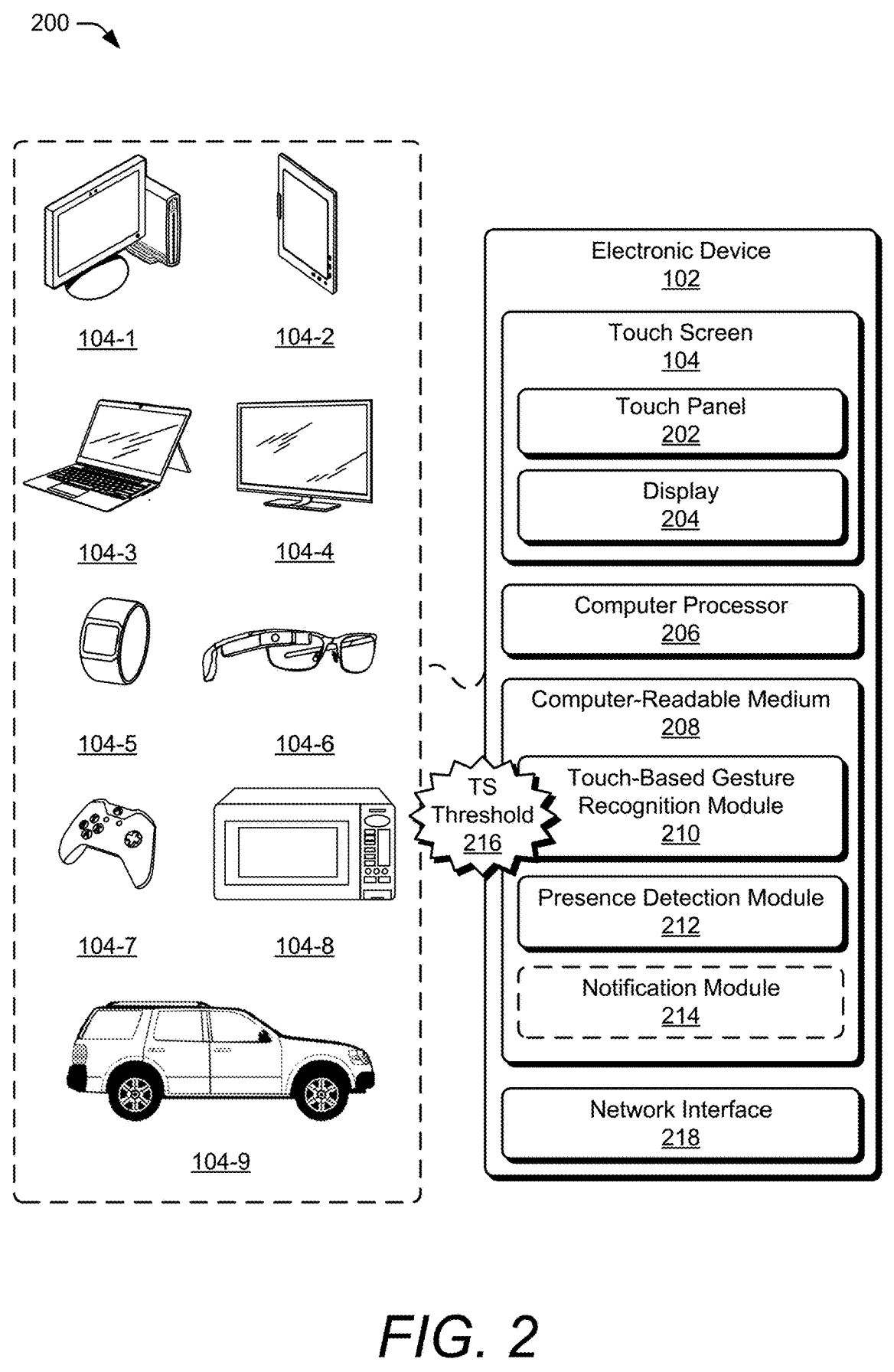

200 ⟍

104-1

104-2

104-3

104-4

104-5

104-6

104-7

104-8

104-9

Electronic Device
102

Touch Screen
104

Touch Panel
202

Display
204

Computer Processor
206

Computer-Readable Medium
208

Touch-Based Gesture Recognition Module
210

Presence Detection Module
212

Notification Module
214

Network Interface
218

TS Threshold
216

| 55.1 | 85.6 | 85.8 | 70.5 | 86.4 | 86.8 | 53.6 |
| 77.7 | 87.2 | 87.7 | 87.3 | 85.1 | 87.0 | 79.6 |
| 72.9 | 83.1 | 82.7 | 82.5 | 82.7 | 80.9 | 74.8 |
| 74.3 | 84.2 | 82.2 | 82.2 | 82.6 | 82.4 | 76.0 |
| 70.7 | 84.8 | 84.0 | 81.2 | 82.5 | 83.6 | 74.9 |
| 71.9 | 80.1 | 82.3 | 82.7 | 83.2 | 83.9 | 76.8 |
| 72.6 | 82.3 | 82.8 | 83.7 | 82.1 | 84.5 | 72.4 |
| 74.1 | 84.0 | 83.6 | 84.4 | 84.8 | 84.8 | 73.8 |
| 81.4 | 92.0 | 91.3 | 92.1 | 91.0 | 92.6 | 80.4 |
| 56.7 | 95.7 | 98.1 | 96.5 | 98.7 | 98.3 | 57.8 |

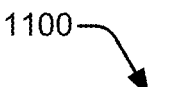
1100

Detect a touch event using a capacitive touch
screen of an electronic device, the touch event
representing a user interacting with the touch
screen to perform a touch-based gesture
1102

Detect a presence of a screen protector on the
touch screen based on touch screen data provided by
the capacitive touch screen, the touch screen data
including information associated with the touch event
1104

FIG. 11

SCREEN PROTECTOR PRESENCE DETECTION

CROSS-REFERENCE TO RELATED APPLICATION

This application is a continuation application of International Application Serial No. PCT/US2023/075574, filed Sep. 29, 2023, the disclosure of which is incorporated by reference herein in its entirety.

BACKGROUND

Many electronic devices have a display that may be engaged by an operator to generate visual output. In particular, the operator can interact with the device through touch inputs to change the visual output. The display, however, can be susceptible to scratches from various objects such as keys, coins, and rough surfaces. Dust, dirt, and fingerprint smudges may also damage and reduce the cleanliness of the display. The operator can attach a screen protector to the display to safeguard the display from scratches, fingerprints, and other types of damage. However, the screen protector can degrade an ability of the operator to interact with the device through touch inputs.

SUMMARY

Techniques and apparatuses are described that implement screen protector presence detection. A screen protector may protect a touch screen of an electronic device from wear and tear and provide other additional benefits such as enhancing privacy, reducing eye strain, reducing dirt accumulation, and upholding the resale value of the device. Upon installing a screen protector, a touch sensitivity of the electronic device may be negatively impacted by the added layer of the screen protector, which is disposed above one or more sensors of the touch screen. In example aspects, an electronic device detects the presence (or absence) of a screen protector based on touch screen data provided by a touch screen during a time period that a user performs a touch-based gesture. Upon determining the presence or absence of the screen protector, a sensitivity profile for detecting and recognizing touch-based gestures may be adapted for optimal performance.

Aspects described below include a method. The method includes detecting a touch event on a capacitive touch screen of an electronic device. The touch event represents a user interacting with the touch screen to perform a touch-based gesture. The method also includes detecting a presence of a screen protector on the touch screen based on touch screen data provided by the capacitive touch screen. The touch screen data includes information associated with the touch event.

Aspects described below also include an apparatus comprising a capacitive touch screen and a processor. The apparatus is configured to perform, using the capacitive touch screen and the processor, any of the described methods.

Aspects described below include a computer-readable storage medium comprising computer-executable instructions that, responsive to execution by a processor, cause a computer system to perform any one of the described methods.

Aspects described below also include a system with means for performing screen protector presence detection.

BRIEF DESCRIPTION OF DRAWINGS

To easily identify the discussion of any particular element or act, the most significant digit or digits in a reference number refer to the figure number in which that element is first introduced.

FIG. 2 illustrates an example implementation of an electronic device that can implement aspects of screen protector presence detection.

FIG. 5 illustrates an example signal uniformity area determined during calibration of a touch screen.

FIG. 11 illustrates an example method for performing an aspect of screen protector presence detection.

DETAILED DESCRIPTION

Screen protectors have been used to safeguard touch screens of many electronic devices. The screen protectors come in a myriad of sizes, including ultra-thin designs configured to preserve the device's original display clarity. Some screen protectors have tempered glass protectors that offer scratch resistance and may cover all edges of the touch screen, with some protectors even having self-healing technology to allow tiny scratches to fade over time. In some situations, it is desirable to determine whether or not a screen protector is present.

Some techniques address this by embedding an additional sensor outside of a display area of the electronic device. This sensor, which can be a capacitive sensor, detects a conductive logo that is embedded within the screen protector. This technique, however, requires coordination between manufacturers of the electronic device and the screen protector to ensure that the sensor and conductive logo are positioned proximate to each other when the screen protector is installed on the electronic device. Further issues can arise when the user installs a different screen protector that does not include the conductive logo or installs the screen protector with the conductive logo incorrectly. These situations can cause the sensor to fail to detect the presence of the screen protector.

To address this and other challenges, techniques are described that implement screen protector presence detection. In example aspects, an electronic device detects the presence (or absence) of a screen protector based on touch screen data provided by a touch screen during a time period that a user performs a touch-based gesture. With the touch screen data, screen protector presence detection can be performed without the need for additional sensors and without placing manufacturing requirements on the screen protector. Furthermore, this technique can support the detection of a variety of different screen protectors, including screen protectors with different types of materials and thicknesses.

Upon determining the presence or absence of the screen protector, a sensitivity profile of the electronic device for detecting and recognizing touch-based gestures may be adapted for optimal performance. In an embodiment, upon determining that the screen protector is present, a sensitivity for recognizing subsequent touch-based gestures may be increased to compensate for the decreased sensitivity caused by the presence of the screen protector. Further, upon determining that the screen protector is absent, the sensitivity may be reduced to decrease a probability of false detections. This may be applicable to various electronic devices regardless of size, geometry, configuration, and other physical limitations of the components of the electronic device.

Operating Environment

Figure 1:
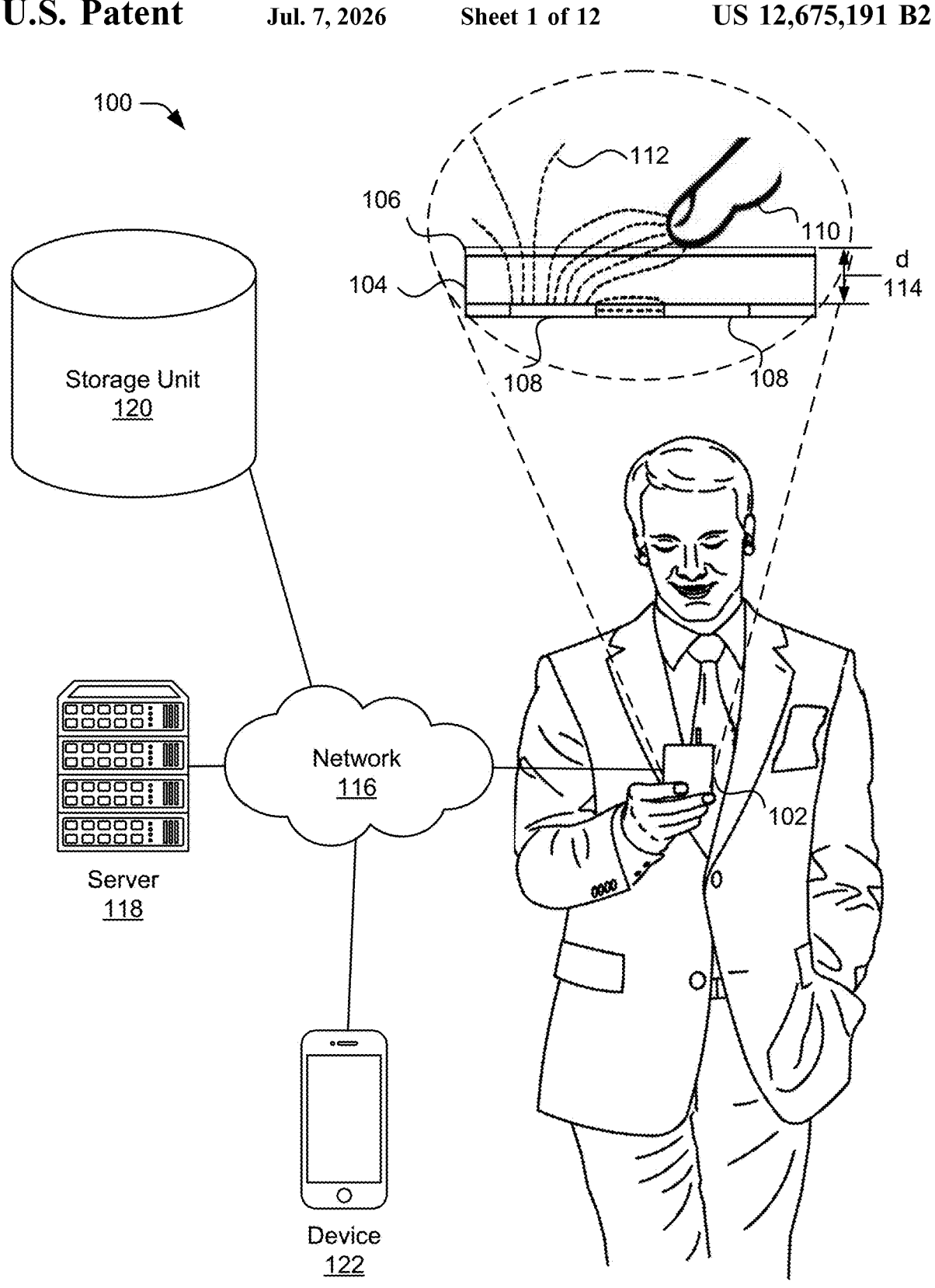
FIG. 1 illustrates an example environment in which screen protector presence detection may be implemented.

FIG. 1 is an illustration of an example data processing environment 100 in which screen protector presence detection can be implemented. The data processing environment 100 includes an electronic device 102, such as a mobile phone or a smartphone, that is used to view and manipulate data, receive phone calls, send text messages, and connect to the internet via cellular networks. Electronic devices 102 may include a variety of components, such as cameras and apps, which makes them multipurpose gadgets that do more than just communicate. Smartphones, in particular, have become an indispensable component of modern life, serving as personal assistants, entertainment centers, navigation tools, and so on.

The electronic device 102 includes a touch screen 104 (touchscreen) or original display on which a screen protector 106 may be disposed. The touch screen 104 is a capacitive touch screen, which includes an array of sensors 108 underlying a conductive region of the touch screen 104. A user (or an operator) may install the screen protector 106 on the electronic device 102 to protect the touch screen 104. The screen protector 106, however, may reduce the performance of the underlying touch screen 104. This is because the added layer of material between the touch screen 104 and the user's finger 110 can make it more difficult for the electronic device 102 to detect and/or identify a touch-based gesture using the touch screen 104.

During operation, the touch screen 104 generates an electric field 112 using at least a subset of the sensors 108. Another subset of the sensors 108 measures capacitance to detect the finger 110. In one example aspect, the capacitance represents a mutual capacitance between a transmitting sensor 108 and a receiving sensor 108. In this case, the subset of transmitting sensors 108 can represent different sensors than the subset of receiving sensors 108. In another example aspect, the capacitance represents a self-capacitance measured by a sensor that generates the electric field 112 and measures the capacitance to detect the finger 110. In this case, the subset of transmitting sensors 108 and the subset of receiving sensors 108 represent a same subset of sensors 108. When the user does not perform a touch-based gesture, the capacitance is at a baseline level. The capacitance changes relative to the baseline level while the user performs a touch-based gesture, as further described below.

Consider a case in which the touch screen 104 utilizes mutual capacitance to detect a touch-based gesture. When the screen protector 106 is not present during a touch-based gesture, the finger 110 strongly interacts with the electric field 112. This significantly reduces the mutual capacitance measured by the sensors 108 relative to the baseline level. When the screen protector 106 is fitted onto the touch screen 104, a distance 114 (d 114) between the finger 110 and the sensors 108 increases. The increased distance 114 weakens the interaction between the finger 110 and the electric field 112. Consequently, the mutual capacitance measured while the user performs the touch-based gesture is increased, at least compared to the mutual capacitance measured when there is no screen protector 106 and the touch-based gesture is performed. In this sense, when the screen protector 106 is fitted on the electronic device 102, a sensitivity of the touch screen 104 is reduced as the touch screen 104 detects a smaller change in the mutual capacitance between the baseline level and a level during the touch-based gesture. Degraded sensitivity can make it harder for the electronic device 102 to detect and/or identify the touch-based gesture accurately and/or consistently. To address this, the electronic device 102 performs aspects of screen protector presence detection, as further described with respect to FIG. 2.

The data processing environment 100 further includes a network 116. The network 116 is a medium used to provide communications links between various devices, training systems, and computers connected together within the data processing environment 100. The network 116 may include connections, such as wire, wireless communication links, or fiber optic cables. Example networks 116 can include a local-area network (LAN), a wireless local-area network (WLAN), a personal-area network (PAN), a wide-area network (WAN), an intranet, the Internet, a peer-to-peer network, a point-to-point network, a mesh network, Bluetooth®, and the like. The network 116 can communicatively couple the electronic device 102 to other entities, such as a server 118, a storage unit 120, and/or another device 122. The device 122 is an example of the electronic device 102 described herein. For example, the device 122 can take the form of a smartphone, a tablet, or a laptop computer with a touch screen feature. The electronic device 102 is further described with respect to FIG. 2.

FIG. 2 illustrates an example electronic device 102. The electronic device 102 is illustrated with various non-limiting example devices, including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a baby monitor, a Wi-Fi™ router, a drone, a trackpad, a drawing pad, a netbook, an e-reader, a home automation and control system, a wall display, and another home appliance. Note that the electronic device 102 can be wearable, non-wearable but mobile, or relatively immobile (e.g., desktops and appliances).

The electronic device 102 includes the touch screen 104. The touch screen 104 is an assembly of both a touch panel 202 and a display 204. The touch panel 202 includes the sensors 108 and represents an input device. As an input device, the touch panel 202 provides a means for the user to interact and provide inputs to the electronic device 102 through touch-based gestures. The display 204 represents an output device, which displays content to the user. The touch panel 202 can be layered on the top of the display 204 in some implementations of the touch screen 104. The touch panel 202 and the display 204 are further described with respect to FIG. 3.

The electronic device 102 also includes one or more computer processors 206 and at least one computer-readable medium 208, which includes memory media and/or storage media. Applications and/or an operating system (not shown) embodied as computer-readable instructions on the computer-readable medium 208 can be executed by the computer processor 206 to provide some of the functionalities described herein. The computer-readable medium 208 can include a touch-based gesture recognition module 210, which detects and identifies different types of touch-based gestures. The touch-based gesture recognition module 210 can pass information regarding the touch-based gesture to other applications of the electronic device 102.

The computer-readable medium 208 also includes at least one presence detection module 212, which performs, at least in part, screen protector presence detection. The presence detection module 212 detects a presence (or absence) of the screen protector 106 using data provided by the touch screen 104 regarding a touch-based gesture.

Performing screen protector presence detection based on data generated by the touch screen 104 can be challenging as the data can be influenced by a variety of factors. In one aspect, different screen protectors can have different thicknesses and/or materials, which can impact the sensitivity for detecting touch-based gestures by different amounts. In another aspect, different users can cause the data provided by the touch screen 104 to vary. Differences in finger sizes between an adult and a child, for instance, can impact an amount that the finger 110 interacts with the electric field 112. Different individuals may also have a heavy touch or a light touch while performing a touch-based gesture, which can also impact the interaction between the finger 110 and the electric field 112. Variations can also occur between different types of touch-based gestures. Other factors can also involve the orientation of the electronic device 102 and/or a grounding condition of the electronic device 102.

Figure 4:
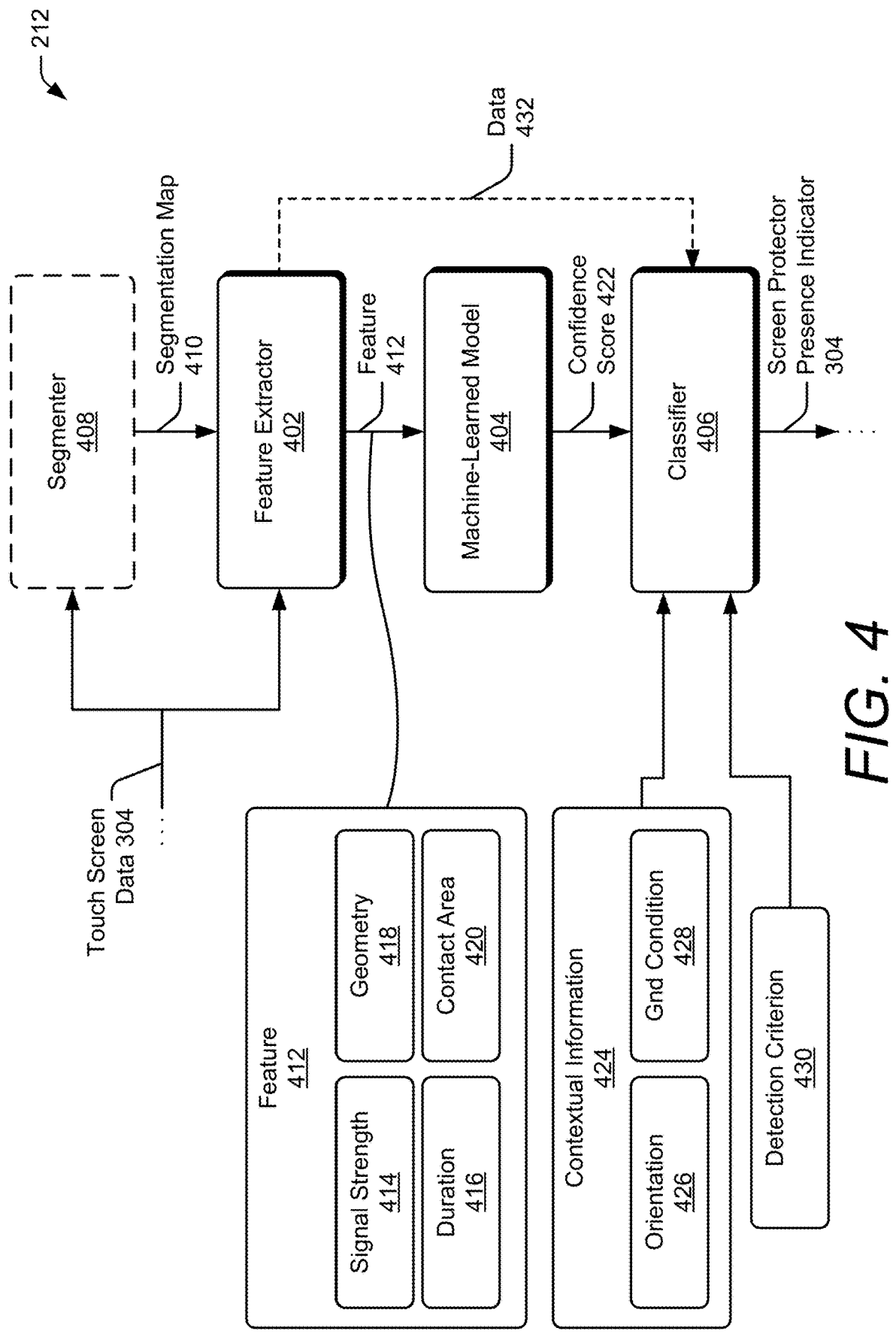
FIG. 4 illustrates an operation of a presence detection module for performing an aspect of screen protector presence detection.
Figure 6:
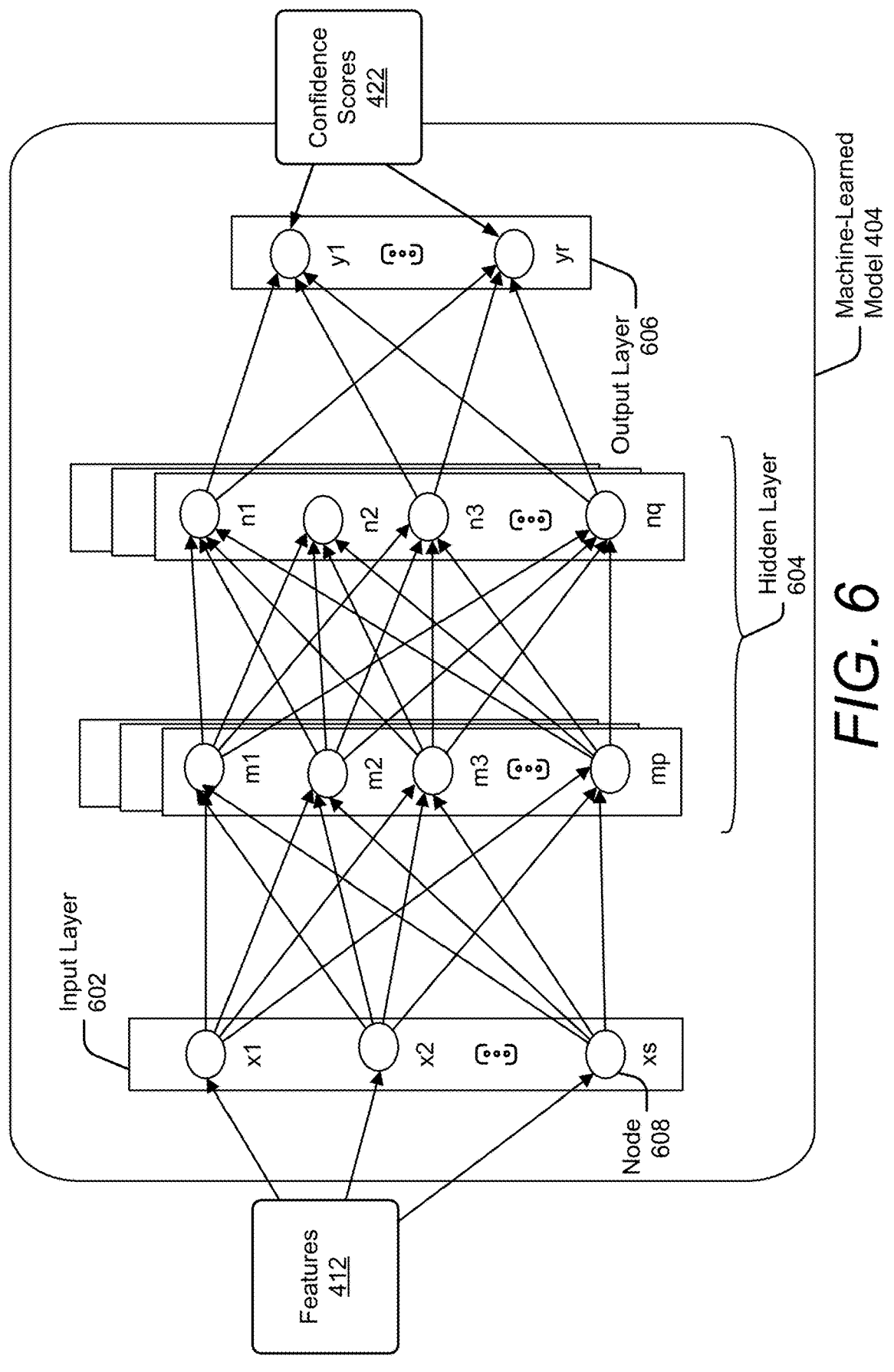
FIG. 6 illustrates an example architecture of a machine-learned model capable of performing aspects of screen protector presence detection.

To handle the variety of factors that can make screen protector presence detection challenging, the presence detection module 212 can be implemented using at least one machine-learned model, as further described with respect to FIGS. 4 and 6. By employing techniques associated with machine learning, the presence detection module 212 can accurately detect the presence of a variety of screen protectors 106 without relying on an additional sensor that is dedicated to that purpose.

The computer-readable medium 208 can optionally include at least one notification module 214. The notification module 214 can communicate information to the user that recommends a particular setting for touch-based gesture recognition based on whether the screen protector 106 is present or not present. An example setting can be associated with a touch sensitivity threshold 216 (TS threshold 216) of the touch-based gesture recognition module 210. In general, decreasing the touch sensitivity threshold 216 can at least partially compensate for the decreased sensitivity experienced while the screen protector 106 is installed. Also, increasing the touch sensitivity threshold 216 can at least partially compensate for the increased sensitivity that occurs while the screen protector 106 is not installed. Dynamically adjusting the touch sensitivity threshold 216 based on the presence (or absence) of the screen protector 106 can provide the user a consistent experience interacting with the electronic device 102 using touch-based gestures.

In some aspects, the notification module 214 can monitor the information provided by the presence detection module 212 to detect a change indicative of the user installing the screen protector 106 on the electronic device 102 or removing the screen protector 106 from the electronic device 102. The notification provided by the notification module 214 can be communicated to the user using a visual message provided by the display 204, using an audible message provided by a speaker of the electronic device 102 (not shown), or using other known techniques.

The electronic device 102 can also include a network interface 218 for communicating data over wired, wireless, or optical networks. For example, the network interface 218 may communicate data over the network 116. In this way the electronic device 102 can communicate with the server 118, the storage unit 120 and/or the device 122. In some implementations, one or more of the server 118, the storage unit 120, and/or the device 122 can assist with screen protector presence detection. For example, the server 118 may include one or more graphic processing units (GPUs) for training one or more machine-learned models of the electronic device 102 that performs an aspect of screen protector presence detection. A database of the storage unit 120 may be or include information associated screen protector presence detection. The device 122 can relay notifications provided by the notification module 214 to the user.

Generally, certain operations are described as occurring at a certain component or location in an embodiment. Such locality of operations is not intended to be limiting on the illustrative embodiments. Any operation described herein as occurring at or performed by a particular component (e.g., the presence detection module 212) can be implemented in such a manner that one component-specific function causes an operation to occur or be performed at another component, such as at a local or remote machine-learning (ML) or natural language processing (NLP) engine. A method of an embodiment described herein, when implemented to execute on a device or data processing system, comprises substantial advancement of the functionality of that device or data processing system in electronic notification delivery by enabling automatic screen protector presence detection using data provided by a touch screen based on a touch event without limitations to a screen protector size or electronic device configuration. An operation of the touch screen 104 and the computer processor 206 are further described with respect to FIG. 3.

Figure 3:
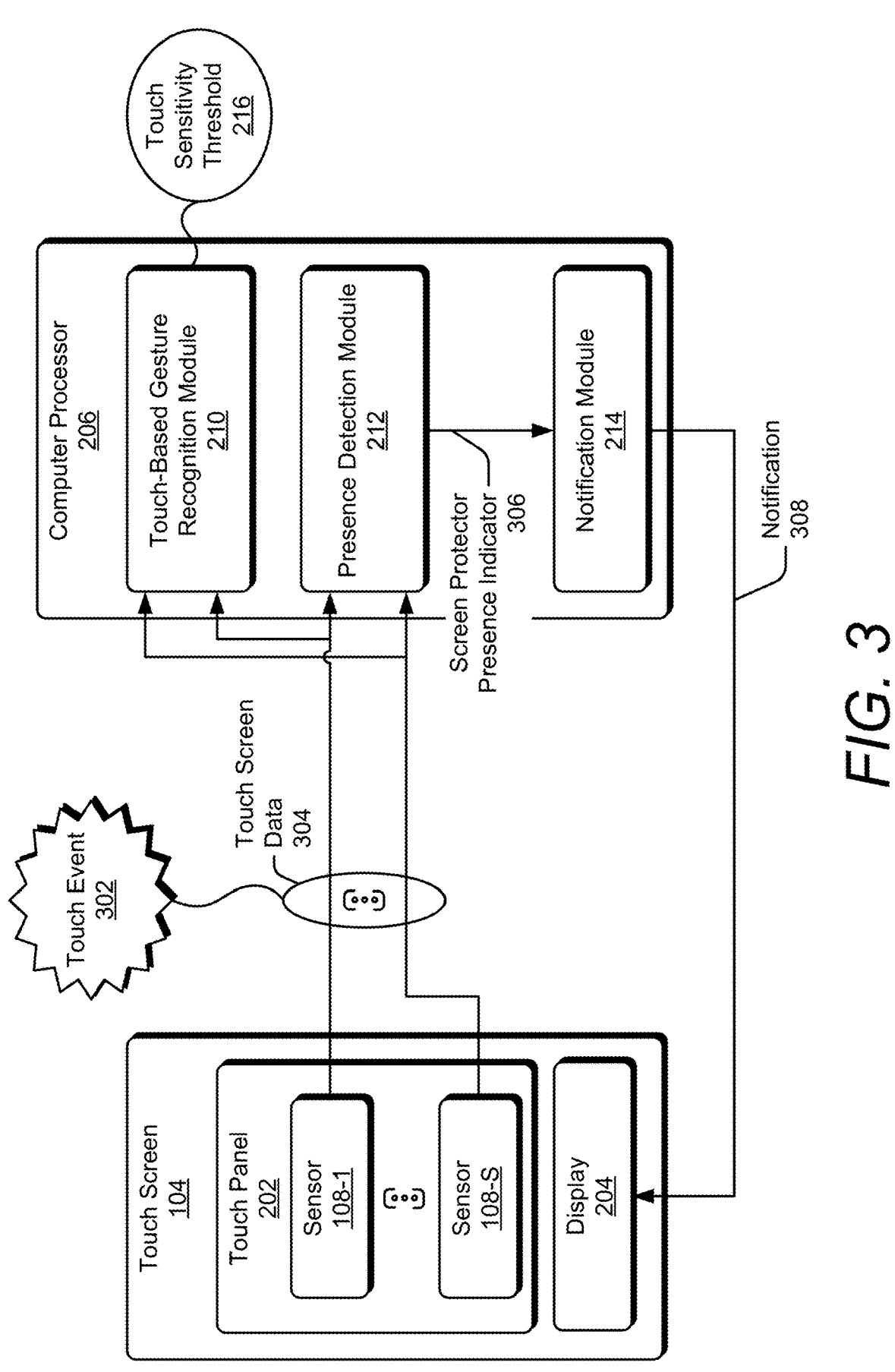
FIG. 3 illustrates an example system diagram depicting a touch screen and a computer processor.

FIG. 3 is a system diagram illustrating communication between the touch screen 104 and the computer processor 206. In the depicted configuration, the touch screen 104 is coupled to the computer processor 206. The touch screen 104 includes the touch panel 202 and the display 204. The touch panel 202 includes sensors 108-1 to 108-S, where S represents a positive integer. The sensors 108-1 to 108-S can include transmitting and receiving sensors.

The computer processor 206 implements the touch-based gesture recognition module 210, the presence detection module 212, and the notification module 214. The touch-based gesture recognition module 210 and the presence detection module 212 are coupled to the touch panel 202. The notification module 214 is coupled to an output of the presence detection module 212. The notification module 214 can be coupled to the display 204 in some implementations.

During an operation of the electronic device 102, the touch panel 202 uses the sensors 108-1 to 108-S to detect a touch event 302. The touch event 302 represents a situation in which the user interacts with the touch screen 104 by performing a touch-based gesture. The touch-based gesture can involve a tap, a swipe, a two-finger pinch, a two-finger spread, and so forth. The touch-based gesture can be performed using an appendage of the user, such as the finger 110, or using a hand-held object that can interact with the touch screen 104, such as a stylus.

The touch panel 202 generates touch screen data 304 on a continual or periodic basis. The touch screen data 304 can include raw data that is measured by at least a subset of the sensors 108-1 to 108-S (e.g., the receiving sensors). During time intervals that the user performs a touch-based gesture, the touch screen data 304 includes information that enables the touch-based gesture recognition module 210 to detect and identify the touch-based gesture. This information also enables the presence detection module 212 to detect the presence or absence of the screen protector 106. During time intervals in which the user does not perform a touch-based gesture, the touch screen data 304 can include information that indicates an absence of a touch-based gesture.

The touch-based gesture recognition module 210 accepts the touch screen data 304. Using the touch sensitivity threshold 216, the touch-based gesture recognition module 210 can detect the touch event 302 and recognize the touch-based gesture associated with the touch event 302.

The presence detection module 212 accepts the touch screen data 304 and performs screen protector presence detection based on the touch screen data 304. The presence detection module 212 generates a screen protector presence indicator 306 based on this determination. The screen protector presence indicator 306 can have two values or states to indicate that the screen protector 106 is present or absent.

The notification module 214 generates a notification 308 based on the screen protector presence indicator 306. In one example implementation, the notification 308 indicates to the user that the screen protector 106 is present or absent. In another example implementation, the notification module 214 can inform the user that a current setting for touch-based gesture recognition is suboptimal based on a current value or state of the screen protector presence indicator 306. More specifically, the notification module 214 can warn the user if the touch sensitivity threshold 216 is suboptimal based on the presence or absence of the screen protector 106. This notification 308 can prompt the user to select a different mode that is optimal based on the screen protector presence indicator 306. This mode can be associated with a different touch sensitivity threshold 216 for touch-based gesture recognition. In this example, the notification module 214 sends the notification 308 to the display 204, which provides the notification 308 to the user. The presence detection module 212 is further described with respect to FIG. 4.

Screen Protector Presence Detection

FIG. 4 illustrates an example presence detection module 212, which can perform screen protector presence detection. In the depicted configuration, the presence detection module 212 includes at least one feature extractor 402, at least one machine-learned model 404, and at least one classifier 406. The machine-learned model 404 is coupled between the feature extractor 402 and the classifier 406. The classifier 406 can also be directly coupled to the feature extractor 402. Other implementations are also possible in which the feature extractor 402, the machine-learned model 404, and the classifier 406 are implemented as a single machine-learned model.

The presence detection module 212 can optionally include at least one segmenter 408. In this case, the feature extractor 402 can be coupled between the segmenter 408 and the machine-learned model 404. Other implementations are also possible in which the functionality of the segmenter 408 is incorporated within the feature extractor 402.

During operation, the segmenter 408 (if implemented) and the feature extractor 402 accept the touch screen data 304 provided by the sensors 108 of the touch panel 202. The touch screen data 304 can include a heat map and/or touch coordinates. The heat map includes amplitude data indicative of the capacitance measured by the sensors 108. The heat map can include information representative of a two-dimensional grid, with different amplitude data associated with different pairs of sensors 108 within the array. The touch coordinates can indicate a determined position of one or more fingers (or hand-held objects) associated with a touch event 302.

The touch screen data 304 represents a temporal sequence of frames. Each frame of the touch screen data 304 represents a snapshot in time in which data is collected using the sensors 108. Throughout a duration of a touch-based gesture, the touch screen 104 can provide multiple frames of the touch screen data 304 to the presence detection module 212. In this case, values of the heat map can change over sequential frames as the touch-based gesture is performed. In one aspect, the sequence of frames (e.g., a sequence of heat maps) may be perpetual. Alternatively, the sequence may be halted until changes are observed by the touch panel 202 that may indicate occurrence of a touch event 302.

The segmenter 408 processes the touch screen data 304 to define a region in which the touch-based gesture occurs on the touch screen 104. The segmenter 408 provides this information to the feature extractor 402 as a segmentation map 410. In general, the segmentation map 410 provides additional context about the heat map for use by the feature extractor 402. In some aspects, the segmentation map 410 can indicate whether or not a touch event 302 occurs within a predetermined region that can facilitate screen protector presence detection. This predetermined region represents an area of the touch screen 104 in which the sensors 108 have relatively uniform responses, as further described with respect to FIG. 5.

The feature extractor 402 analyzes the touch screen data 304, using the segmentation map 410 if available, to generate one or more features 412 for screen protector presence detection. In some implementations, the feature extractor 402 monitors all touch events 302 detected by the touch screen 104 and produces a set of features 412 for each touch event 302. As used herein, a touch event 302 generally refers to a situation in which the user interacts with the touch screen 104 to provide input via a touch-based gesture.

Example features 412 can include a signal strength 414 associated with the touch event 302, a duration 416 associated with the touch event 302, a geometry 418 associated with the touch event 302, and/or a contact area 420 associated with the touch event. The signal strength 414 can indicate an amount of capacitance detected by the touch screen 104. The duration 416 can indicate a duration that the finger 110 (or a hand-held object) is in contact with the touch screen 104 to perform a touch-based gesture. The geometry 418 can indicate a geometry associated with the finger 110 (or the hand-held object). More specifically, the geometry 418 represents a shape that the finger 110 makes while in contact with the touch screen 104. The contact area 420 can indicate a region over which the touch-based gesture (or a portion of the touch-based gesture) is performed.

In an aspect, the feature extractor 402 can ignore touch events 302 that occur outside of the predetermined region associated with signal uniformity. This may be beneficial in simplifying the training of the machine-learned model 404 and reducing an overall complexity of the machine-learned model 404 for performing screen protector presence detection.

The machine-learned model 404 can represent a trained deep learning model. In general, the machine-learned model 404 analyzes one or more features 412 associated with a touch event 302 and maps the characteristics to one or more confidence scores 422. For instance, the machine-learned model 404 generates a confidence score 422 to indicate a likelihood that a feature 412 of a corresponding frame of a touch event 302 is indicative of the presence of the screen protector 106. The confidence score 422 represents a confidence level at which the machine-learned model 404 determines that the screen protector 106 is present and/or absence. The machine-learned model 404 can include a suite of networks that can be individually selected according to the type of electronic devices 102 and/or touch screen 104 used.

In some implementations, the machine-learned model 404 relies on supervised learning and can use measured (e.g., real) data for machine-learning training purposes. Training enables the machine-learned model 404 to learn a non-linear mapping function for translating one or more features 412 into one or more confidence scores 422. The training data can incorporate data associated with different types of screen protectors 106, different types of touch-based gestures, variations associated with different users (e.g., variations in finger sizes and applied pressure), different orientations of the electronic device 102, and/or different grounding conditions of the electronic device 102. As such, training of a machine learning model into the machine-learned model 404 can use a large number of training data, as further described with respect to FIG. 6.

In an aspect, the machine-learned model 404 is without limitation thereto a support vector machine (SVM). The support vector machine is a supervised machine learning algorithm used for classification and regression tasks. Support vector machines may be particularly effective in scenarios where the data points are not linearly separable in their original feature space. The support vector machine finds a hyperplane that best separates different classes of data while maximizing a distance between the hyperplane and nearest data points of each class. The hyperplane can then be used for making predictions on new, unseen data. However, in other aspects, a neural network may be used. In comparison to neural networks, a support vector machine may be regarded as a feed-forward neural network with one hidden layer. An example neural network implementation of the machine-learned model 404 is further described with respect to FIG. 6.

The classifier 406 may in addition, or separately, compute a refined determination of the presence of the screen protector 106 using contextual information 424 about the electronic device 102. Example contextual information 424 can include an orientation 426 of the electronic device 102 and/or a grounding condition 428 (Gnd condition 428) of the electronic device 102. The grounding condition 428 indicates whether or not the electronic device 102 has some form of grounding. Example grounding conditions 428 include a port connection status and/or a hand-held status. The port connection status indicates whether or not a port of the electronic device 102 is connected. Example ports can include a universal serial bus (USB) port or a power port of the electronic device 102.

The hand-held status indicates whether or not the electronic device 102 is being held by the user. The hand-held status can be determined in a variety of different ways. In a first example, the electronic device 102 includes a motion sensor, which enables the electronic device 102 to determine if motion of the electronic device 102 corresponds to the user holding the electronic device 102. In a second example, the electronic device 102 can detect a grip of the user using a sensor, such as a capacitive sensor. By detecting the user's grip, the electronic device 102 can suppress unintentional touch events 302 that can occur near the edges of the touch screen 104 due to the user's grip.

The classifier 406 uses the orientation 426 and/or grounding condition 428 of the electronic device 102 to further interpret the confidence score 422 and/or data 432 passed by the feature extractor 402. The data 432 can include the touch screen data 304 or a processed version thereof. When the electronic device 102 is grounded, the touch screen data 304 (or the data 432) can be more reliable for screen protector presence detection. As such, the classifier 406 can utilize the grounding condition 428 to further adjust the confidence score 422 or the detection criterion 430 based on the grounding condition 428. For example, the classifier 406 can increase the confidence score 422 or relax the detection criterion 430 based on the grounding condition 428 indicating that the electronic device has some form of grounding (e.g., a port is connected or the electronic device 102 is being held by the user). Alternatively, the classifier 406 can decrease the confidence score 422 or increase a strictness of the detection criterion 430 based on the grounding condition 428 indicating that the electronic device 102 is not grounded.

The orientation 426 enables the classifier 406 to perform screen protector presence detection during instances in which the user performs optimal touch-based gestures associated with the current orientation 426 of the electronic device 102. Different types of touch-based gestures may provide more reliable touch screen data 304 (or data 432) for certain orientations 426. In one aspect, the data can be more reliable because it's easier for the user to perform that particular touch-based gesture while the electronic device 102 is in a particular orientation 426. In another aspect, the data can be more reliable because that particular touch-based gesture may occur for a longer duration while the electronic device 102 is in that particular orientation.

Consider a first situation in which the electronic device 102 is in a landscape orientation. In this first situation, utilizing touch screen data 304 captured while the user performs a horizontal swipe gesture can enable the presence detection module 212 to achieve a higher level of accuracy for screen protector presence compared to utilizing touch screen data 304 captured while the user performs a vertical swipe gesture. For the landscape orientation, the horizontal swipe gesture represents an optimal touch-based gesture and the vertical swipe gesture represents a suboptimal touch-based gesture.

Now consider a second situation in which the electronic device 102 is in a portrait orientation. In this second situation, utilizing touch screen data 304 captured while the user performs a vertical swipe gesture can enable the presence detection module 212 to achieve a higher level of accuracy for screen protector presence compared to utilizing touch screen data 304 captured while the user performs a horizontal swipe gesture. For the portrait orientation, the vertical swipe gesture represents an optimal touch-based gesture and the horizontal swipe gesture represents a suboptimal touch-based gesture.

To improve an accuracy of the presence detection module 212 for performing screen protector presence detection, the classifier 406 can generate the screen protector presence indicator 304 during situations in which the touch-based gesture is one of the optimal touch-based gestures associated with the current orientation 426 of the electronic device 102 and the confidence score 422 meets the detection criterion 430. For situations in which the touch-based gesture is not one of the optimal touch-based gestures associated with the current orientation 426, the classifier 406 can ignore the confidence score 422, increase a strictness of the detection criterion 430, or require additional time or touch events 302 before making a final determination in regard to screen protector presence detection.

In general, utilization of the orientation 426 for screen protector presence detection is optional. In some implementations, the classifier 406 utilizes the grounding condition 428 and does not utilize the orientation 426 for screen protector presence detection. The orientation 426 and/or grounding condition 428 can impact the touch screen data 304, as further described below.

Environmental conditions of the electronic device 102 such as a grounding condition 428 of the touch screen 104, how the touch screen 104 is oriented relative to an operator, and information from inertial measurement unit sensors of the electronic device 102 can be utilized to more accurately interpret touch events 302. For example, when the finger 110 touches one sensor 108 and a relatively low signal strength is obtained from the sensor 108, it may be difficult to determine if the relatively low signal strength is due to the screen protector 106 being present or rather due to how the finger 110 interacts with the touch screen 104 (e.g., using a small amount of pressure or using a smaller portion of the finger 110). By obtaining contextual information 424 about the touch screen 104 and the electronic device 102 as a whole, a trust level of sensor signals may be established for making a final determination about the presence of the screen protector 106. Further, a USB connection condition, such as a communication condition, a charging condition, or at least a presence condition of a USB, may affect a sensitivity of the touch screen 104. Thus, determining the USB connection condition as contextual information 424 may enable the presence of the screen protector 106 to be computed more accurately.

The classifier 406 can use a detection criterion 430 as a basis for determining screen protector presence (or absence). The detection criterion 430 can include a confidence score criterion and/or a time criterion. Consider a situation in which multiple touch events 302 are detected over a predetermined first time period. In this example, the presence of the screen protector 106 may be determined based on a predetermined confidence score criterion being met over a portion of the first time period that is indicated by the time criterion. The classifier 406 can also observe the confidence score 422 over a predetermined period of time that is indicated by the time criterion. In this case, the classifier 406 computes a final determination of the presence of the screen protector 106 based on a metric (such as an average of, or a total number of times) in that predetermined period of time that the confidence score 422 meets or exceeds a confidence score criterion.

FIG. 5 illustrates an example signal uniformity area 502 determined during calibration of the touch screen 104. During a calibration process, a conductor (or test tool) is placed at different positions across the touch screen 104 using an automated or manual process. Each position is associated with a sensor that generates the touch screen data 304. At these positions, data is collected regarding a saturation level of the sensor 108 to generate the heat map 504. The heat map 504 indicates regions of uniformity and non-uniformity across the touch panel 202. Sensors 108 at the corners or along an edge of the touch panel 202 can have non-uniform saturation levels, as shown in FIG. 5. In contrast, sensors 108 towards a center of the touch panel 202 can have relatively uniform saturation levels. In particular, the sensors within the signal uniformity area 502 have similar responses. To facilitate screen protector presence detection, the presence detection module 212 can process touch screen data 304 for screen protector presence detection when one or more touch events 302 occur within the signal uniformity area 502, which represents the predetermined region mentioned with respect to FIG. 4. An example implementation of the machine-learned model 404 is further described with respect to FIG. 6.

FIG. 6 illustrates an example architecture of the machine-learned model 404 according to an embodiment in which the machine-learned model 404 is a deep neural network. Generally, the architecture of the machine-learned model 404 can be tailored based on available power, available memory, or computational capability. The machine-learned model 404 can implement, at least partially, screen protector presence detection using machine learning.

The machine-learned model 404 comprises a plurality of layers including an input layer 602, one or more hidden layers 604, and an output layer 606. Each layer may comprise one or more nodes 608, indicated by circles. Information may flow from the input layer 602 to the output layer 606. The nodes 608 can be partially connected or fully connected between the layers.

Each node 608 has an input and an output. The nodes 608 of the input layer 602 are passive, meaning that data thereof is unmodified. For example, the nodes 608 of the input layer 602 may each receive a single value (e.g., a feature 412) on their input and copy the value to their multiple outputs. Conversely, the nodes 608 of the hidden layers 604 and output layer 606 may be active, therefore being able to modify the data. In an example structure, each value from the input layer 602 is copied and sent to the nodes 608 of the hidden layers 604. The values entering the hidden nodes 608 are multiplied by weights, which are a set of predetermined numbers associated with each of the hidden nodes. The weighted inputs are then summed to produce a single number.

In an embodiment, the machine-learned model 404 may use as input at least one of the feature 412 associated with the touch event 302 when determining a confidence score 422 representative of a likelihood that a screen protector 106 is present and/or absent. Thus, the number of the nodes 608 in the input layer 602 is proportional to dimensions of the features 412, and the number of the nodes 608 in the output layer 606 is proportional to dimensions of the confidence scores 422. An electronic device 102 is further described with respect to a training architecture of FIG. 7.

Figure 7:
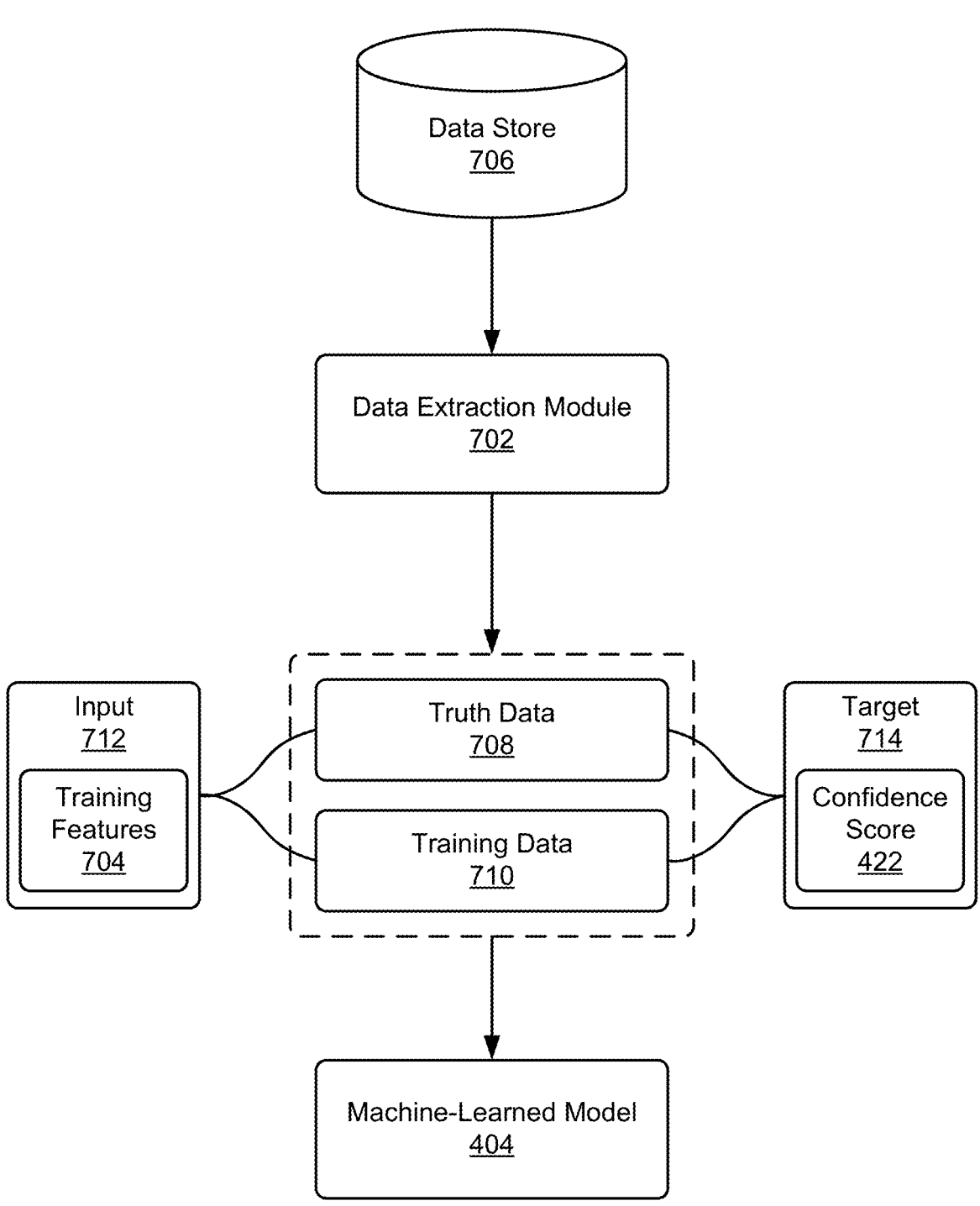
FIG. 7 illustrates a block diagram of a training system capable of training a machine-learned model to perform aspects of screen protector presence detection.

FIG. 7 shows a block diagram illustrating a training of the machine-learned model 404 for screen protector presence detection. The training extracts, via a data extraction module 702, a plurality of training features 704 from a feature dataset of a data store 706. Training features 704 of a known test touch screen device may be used to generate truth data 708 for training the machine-learned model 404. The test touch screen device includes a touch screen 104 with a plurality of sensors 108 configured to generate touch screen data 304 under different test conditions. The test conditions include one or more of activities of engaging the test touch screen device with different finger types, performing different touch-based gestures on the test touch screen device, engaging the test touch screen device with different areas of the finger 110, performing a touch-based gesture in different manners (e.g., at different positions or using a different amount of pressure), setting different grounding conditions for the test touch screen device, using different types of screen protectors, and performing touch-based gestures on different areas of the screen within a signal uniformity area 502. In a first set of scenarios, a known screen protector 106 is present, and in another set of scenarios, the known screen protector 106 is absent. The touch screen data 304, such as heat maps and/or touch coordinates are collected from the sensors 108 of the test touch screen device and labeled.

In an aspect, a first plurality of the labeled data obtained with a touch test tool or any other tools or operators that are known to produce accurate signal strengths on the known test touch screen device is used as the truth data 708. More specifically, the known test touch tool may be, for example, a cylindrical conductor dimensioned to simulate finger touch events. Further, the known test touch tool is used to simulate touches with the screen protector 106 present by attaching a small piece of the screen protector to a bottom of a cylindrical conductor. The screen protector 106 sits between a touch panel 202 and the known test touch tool. Even further, different screen protectors 106 can be used for data generation. Data obtained by use of the known test touch tool is used as the truth data 708.

In another aspect, actual fingers are used to perform similar tests to tests performed with the known test touch tool, and corresponding touch screen data 304 is obtained. The touch screen data 304 is labeled and used as the training data 710. Of course, this is not meant to be limiting, as other ways of obtaining the truth data 708 and the training data 710 may be obtained in view of the descriptions herein. For example, a plurality of other known test touch screen devices may be used to generate more diverse data for training.

The plurality of training features 704 can in some cases be preprocessed to reduce dimensionality thereof or may be raw sensor data. For each set of training features 704, the set is provided as input to a model that is to be trained into the machine-learned model 404. More generally, the data extraction module 702 extracts data from the data store 706 and partitions the data into the truth data 708 and the training data 710. One or more of the training features 704 may be used as at least part of an input 712 (training or validation inputs), and one or more of confidence scores 422 may be used as targets 714 (training or validation targets). The training data 710 is used to train the machine-learned model 404, while the truth data 708 is used to tune hyperparameters of the machine-learned model 404 and make decisions about the machine-learned model 404's structure, such as selecting between different architectures. Even further, another set of data (e.g., test data) can be used to evaluate a final performance of the machine-learned model 404 and to estimate its classification ability to new, unseen features.

Figure 8:
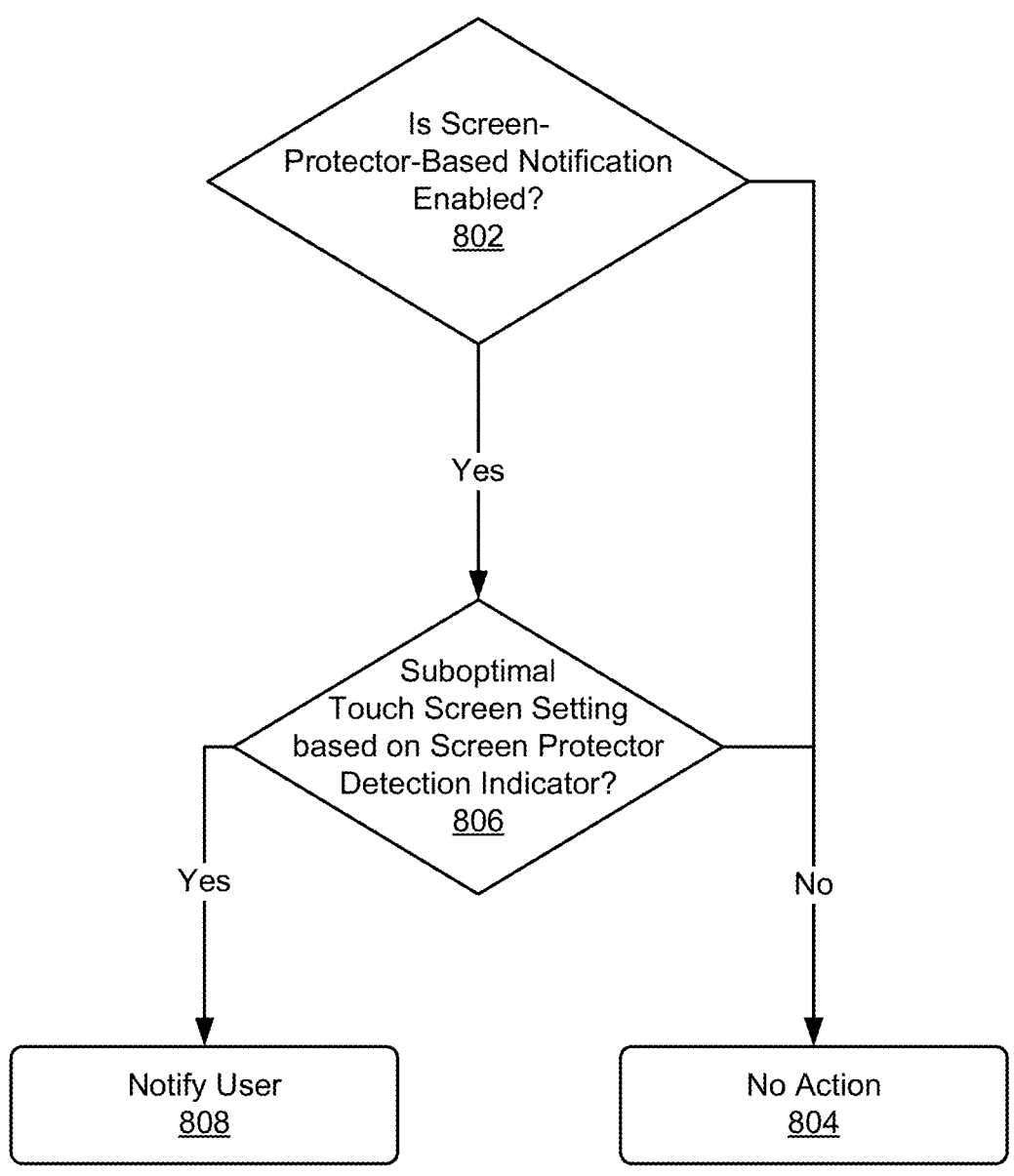
FIG. 8 illustrates an example notification method based on screen protector presence detection.

FIG. 8 depicts an example notification process. Although the example depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the notification method may perform functions at substantially the same time or in a specific sequence.

The process includes determining, at 802, if a screen-protector-based notification is enabled. In general, the screen-protector-based notification is a routine, performed by the notification module 214, to communicate information regarding the detected presence and/or absence of the screen protector 106. In this example, the screen-protector-based notification notifies a user about whether the electronic device 102 is operating with a suboptimal setting (e.g., a suboptimal touch sensitivity threshold 216) relative to a determined presence or absence of the screen protector 106. In other examples, the screen-protector-based notification can notify the user about whether the presence detection module 212 detected the presence or absence of the screen protector 106. Responsive to determining that the screen-protector-based notification is disabled, no additional action is taken at 804. Otherwise, the process continues at 806.

At 806, the process determines if the electronic device 102 is operating with a suboptimal setting based on the screen protector presence indicator 306. For example, if the touch sensitivity threshold 216 of the touch-based gesture recognition module 210 does not correspond with the information provided by the screen protector presence indicator 306, the process continues at 808. In this case, there is a mismatch between the current touch sensitivity threshold 216 utilized by the touch-based gesture recognition module 210 and the presence or absence of the screen protector 106. Otherwise, if the touch sensitivity threshold 216 corresponds with the presence or absence of the screen protector 106, then no additional action is taken at 804. Upon notifying the user at 808, the user can take action to directly or indirectly adjust the touch sensitivity threshold 216. In some implementations, the user is prompted to enable (or disable) a particular mode (e.g., a screen protector mode) based on the detected presence (or absence) of the screen protector 106. Consider the examples described in FIGS. 9 and 10.

Figure 9:
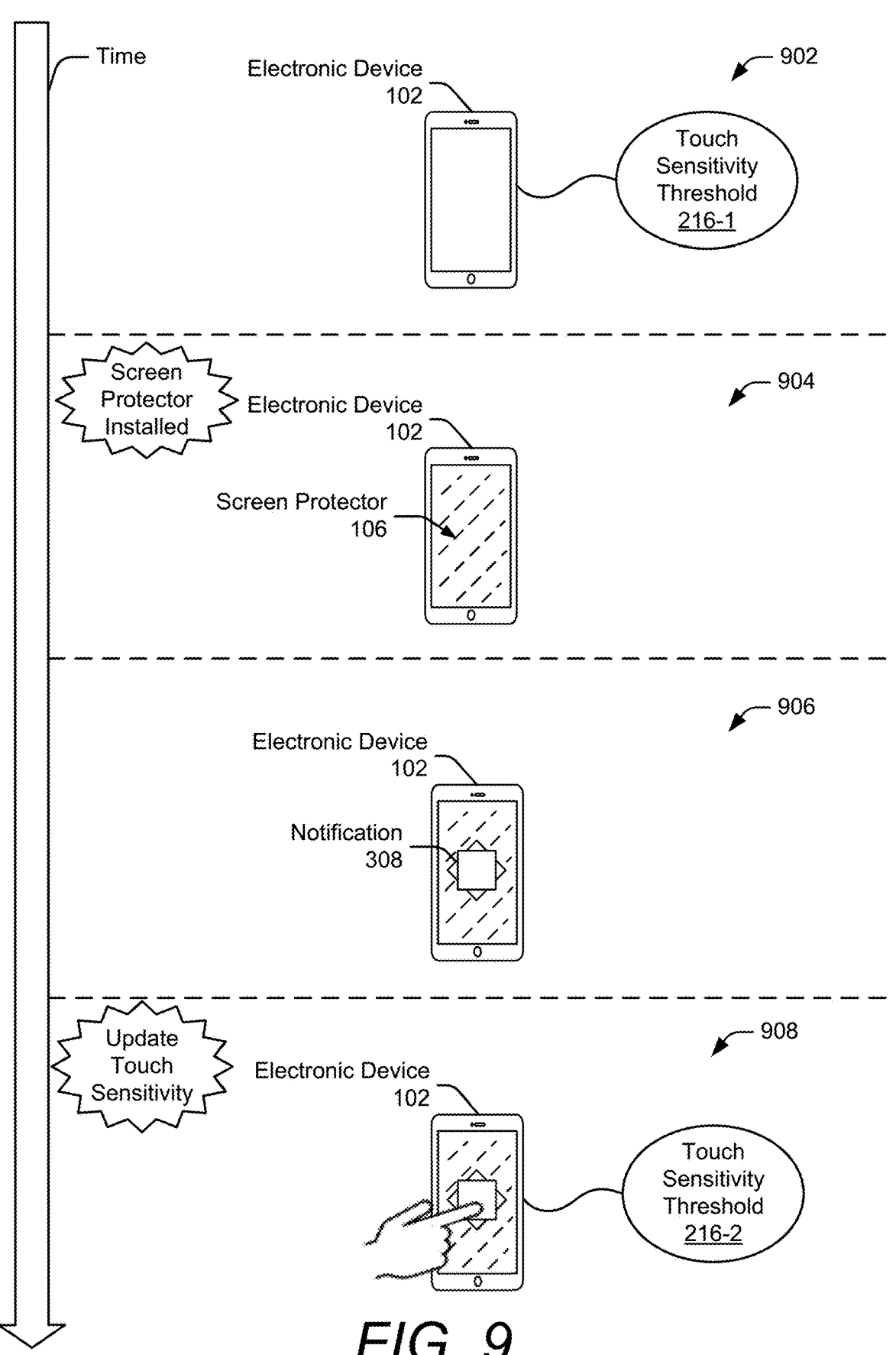
FIG. 9 illustrates a first sequence of events for adjusting a sensitivity threshold based on screen protector presence detection.

FIG. 9 illustrates a first sequence of events for adjusting a sensitivity threshold based on screen protector presence detection, with time elapsing from a top to a bottom of the page. At time 902, the user has yet to install a screen protector 106 on the electronic device 102. As such, the presence detection module 212 determines that the screen protector 106 is absent. In some cases, the electronic device 102 at 902 represents a new electronic device that utilizes default or factory settings. In this case, the touch-based gesture recognition module 210 utilizes a first touch sensitivity threshold 216-1 to perform touch-based gesture recognition. The first touch sensitivity threshold 216-1 can represent a default or factory setting. In this example, the first touch sensitivity threshold 216-1 is determined to be optimal for a situation in which a screen protector 106 is absent.

At 904, the user installs a screen protector 106 on the electronic device 102. The presence detection module 212 determines that the screen protector 106 is present based on the touch screen data 304 associated with a touch event 302. To improve an accuracy of screen protector presence detection, this determination can be made after the classifier 406 determines that the confidence score 422 generated by the machine-learned model 404 meets the detection criterion 430 across multiple touch events 302 and indicates that the screen protector 106 is present.

At 906, the notification module 214 sends a notification 308, via the display 204, to the user. The notification 308 informs the user of an option to enable the screen protector mode as discussed herein. At 908, the user enables the screen protector mode, which causes the touch-based gesture recognition module 210 to perform touch-based gesture recognition using a second touch sensitivity threshold 216-2. The second touch sensitivity threshold 216-2 effectively increases a sensitivity of the electronic device 102 for detecting touch-based gestures. In particular, the second touch sensitivity threshold 216-2 is less than the first touch sensitivity threshold 216-1 to compensate for the presence of the screen protector 106.

Figure 10:
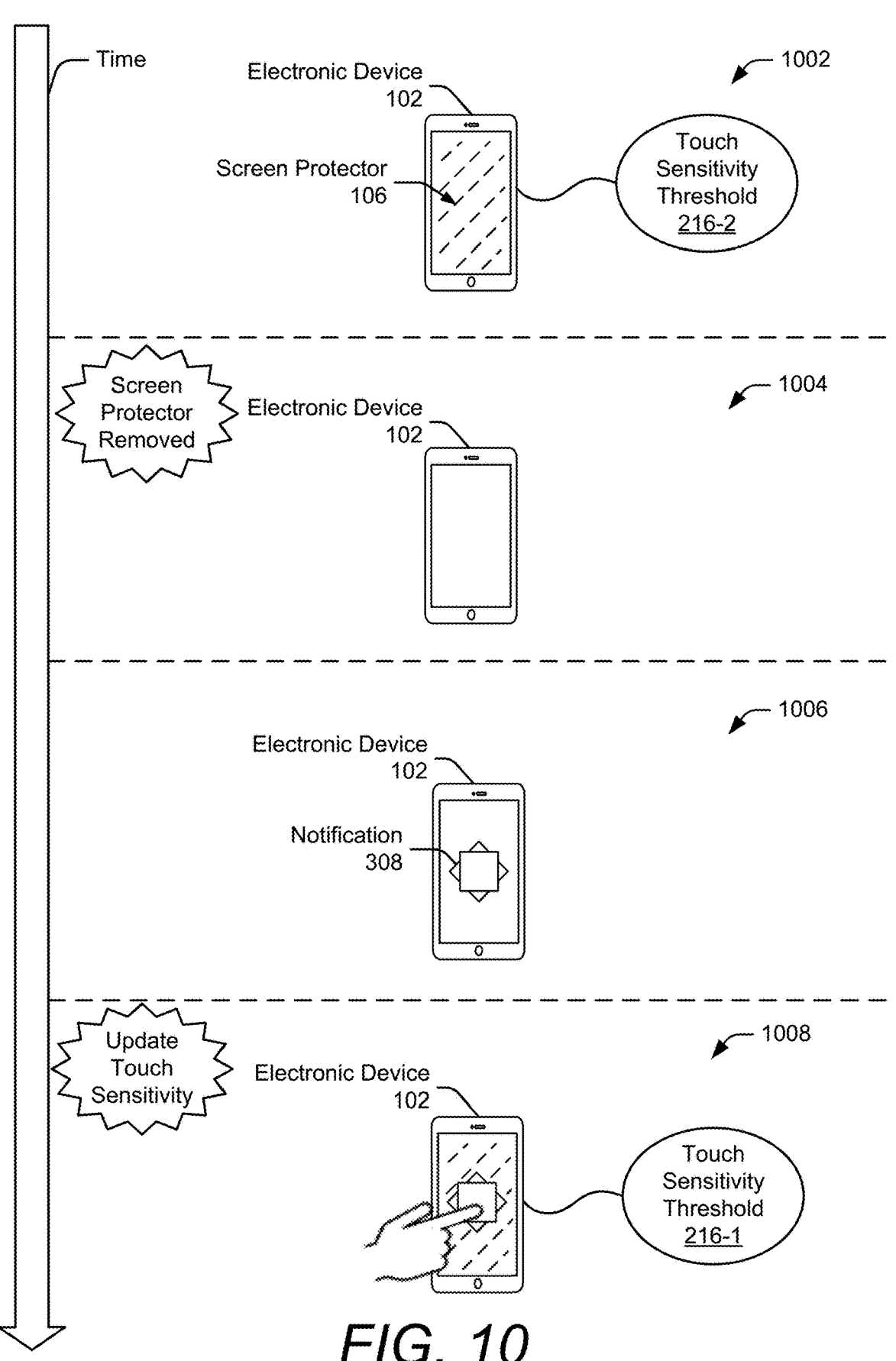
FIG. 10 illustrates a second sequence of events for adjusting a sensitivity threshold based on screen protector presence detection.

FIG. 10 illustrates a second sequence of events for adjusting a sensitivity threshold based on screen protector presence detection, with time elapsing from a top to a bottom of the page. At time 1002, the screen protector 106 is installed on the electronic device 102. The electronic device 102 also operates in accordance with the screen protector mode. This means that the touch-based gesture recognition module 210 performs touch-based gesture recognition using the second touch sensitivity threshold 216-2, which is optimal for situations in which the screen protector 106 is present.

At 1004, the screen protector 106 is removed. The presence detection module 212 determines that the screen protector 106 is present based on the touch screen data 304 associated with a touch event 302. To improve an accuracy of screen protector presence detection, this determination can be made after the classifier 406 determines that the confidence score 422 generated by the machine-learned model 404 meets the detection criterion 430 across multiple touch events 302 and indicates that the screen protector 106 is absent.

At 1006, the notification module 214 sends a notification 308, via the display 204, to the user. The notification 308 informs the user of an option to disable the screen protector mode. At 1008, the user disables the screen protector mode, which causes the touch-based gesture recognition module 210 to perform touch-based gesture recognition using the first touch sensitivity threshold 216-1. The first touch sensitivity threshold 216-1 effectively decreases a sensitivity of the electronic device 102 for detecting touch-based gestures. In particular, the second touch sensitivity threshold 216-1 is greater than the second touch sensitivity threshold 216-2 to compensate for the absence of the screen protector 106. The larger first touch sensitivity threshold 216-1 can reduce a probability of the electronic device 102 incorrectly interpreting other interactions with the touch screen 104 as touch-based gestures.

FIGS. 9 and 10 describe an example notification process in which the user can enable or disable a screen protector mode. Other notification processes are also possible. In some examples, the user can configure the electronic device 102 to use one of three or more modes. In some cases, different modes can be associated with different categories of screen protectors 106. A first example category can include screen protectors 106 that minimally impact the touch sensitivity of the electronic device 102. These screen protectors 106 may be relatively thin and/or have material with a relatively low permittivity. A second example category can include screen protectors 106 that significantly impact the touch sensitivity of the electronic device 102. These screen protectors 106 can be relatively thick and/or have material with a relatively high permittivity. In this case, the touch-based gesture recognition module 210 can selectively operate with one of three or more touch sensitivity thresholds 216. In this example, a first touch sensitivity threshold 216-1 can be optimal when the screen protector 106 is absence, a second touch sensitivity threshold 216-2 can be optimal when a screen protector 106 of the first example category is present, and a third touch sensitivity threshold 216 can be optimal when a screen protector 106 of the second example category is present.

In some implementations, the notification process described in FIGS. 9 and 10 can be skipped, and the electronic device 102 can automatically select the appropriate mode and/or touch sensitivity threshold 216 based on the detected presence or absence of the screen protector 106. The electronic device 102 can optionally notify the user that the touch sensitivity threshold 216 was automatically adjusted.

Example Method

FIG. 11 illustrates a method 1100 for screen protector presence detection. At 1102, a touch event is detected using a capacitive touch screen of an electronic device. The touch event represents a user interacting with the touch screen to perform a touch-based gesture. For example, the touch-based gesture recognition module 210 detects the touch event 302 using the touch screen 104 of the electronic device 102, as described with respect to FIG. 3. The touch event 302 represents a user interacting with the touch screen 104 to perform a touch-based gesture.

At 1104, a presence of a screen protector on the touch screen is detected based on touch screen data provided by the capacitive touch screen. The touch screen data includes information associated with the touch event. For example, the presence detection module 212 detects a presence of a screen protector 106 based on touch screen data 304 provided by the touch screen 104. The touch screen data 304 includes information associated with the touch event 302.

Example Computing System

Figure 12:
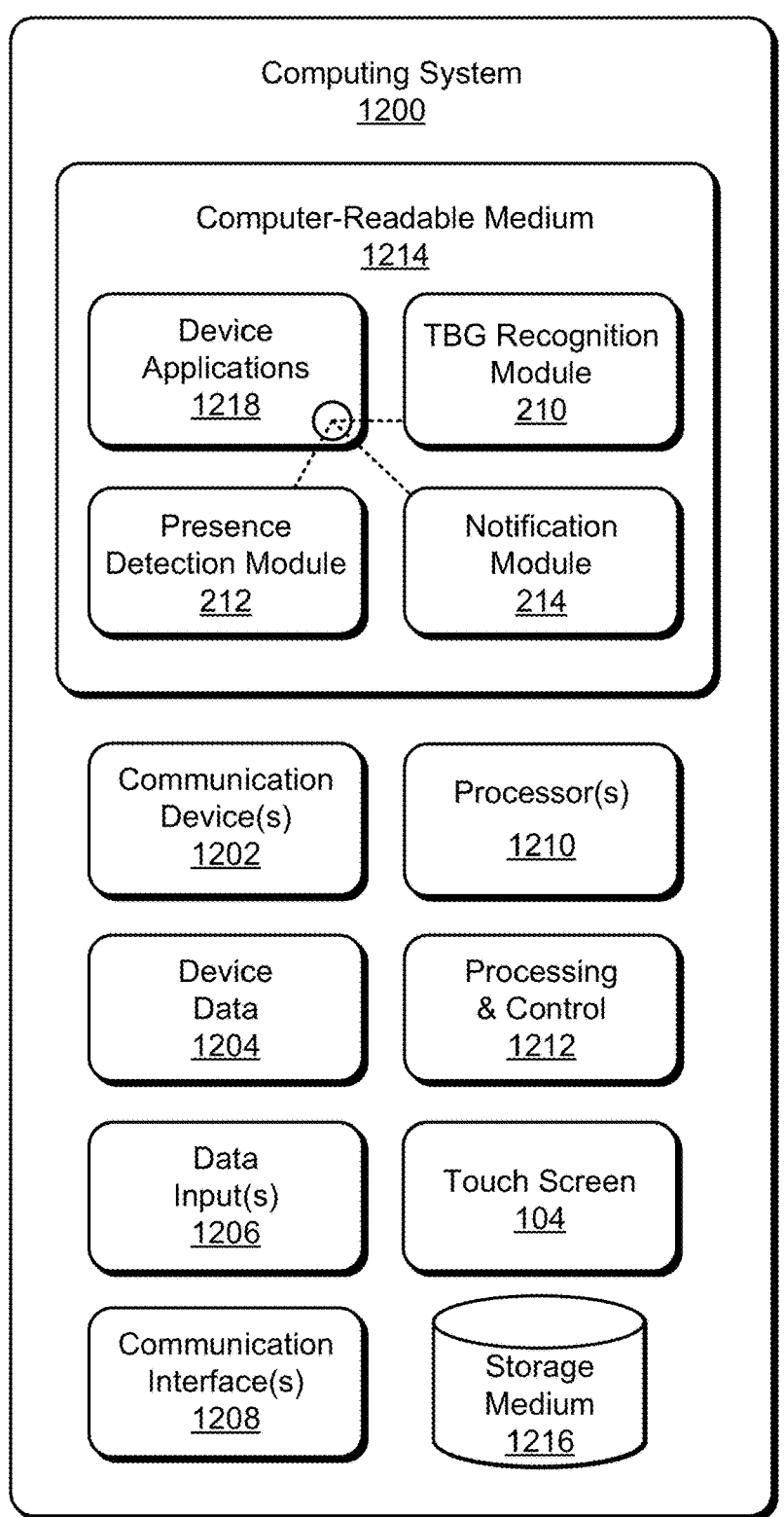
FIG. 12 illustrates an example computing system embodying, or in which techniques may be implemented that enable use of, screen protector presence detection.

FIG. 12 illustrates various components of an example computing system 1200 that can be implemented as any type of client, server, and/or electronic device as described with reference to the previous FIG. 2 to implement aspects of screen protector presence detection.

The computing system 1200 includes communication device(s) 1202 that enable wired and/or wireless communication of device data 1204 (e.g., received data, data that is being received, data scheduled for broadcast, or data packets of the data). The device data 1204 or other device content can include configuration settings of the computing system 1200, media content stored on the computing system 1200, and/or information associated with a user of the computing system 1200. Media content stored on the computing system 1200 can include any type of audio, video, and/or image data. The computing system 1200 includes one or more data input(s) 1206 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1200 also includes communication interface(s) 1208, which can be implemented as any one or more of a serial and/or parallel interface, a wireless interface, any type of network interface, a modem, and any other type of communication interface. The communication interface(s) 1208 provide a connection and/or communication links between the computing system 1200 and a communication network by which other electronic, computing, and communication devices communicate data with the computing system 1200.

The computing system 1200 includes one or more processor(s) 1210 (e.g., any of microprocessors, controllers, and the like), which process various computer-executable instructions to control operation of the computing system 1200. Alternatively, or in addition, the computing system 1200 can be implemented with any one or combination of hardware, firmware, or fixed logic circuitry that is implemented in connection with processing & control circuits 1212. Although not shown, the computing system 1200 can include a system bus or data transfer system that couples the various components. A system bus can include any one or combination of different bus structures, such as a memory bus or memory controller, a peripheral bus, a USB, and/or a processor or local bus that utilizes any of a variety of bus architectures.

The computing system 1200 (or the communication device(s) 1202, include at least one touch screen 104, which can be a capacitive touch screen. The computing system 1200 also includes a computer-readable medium 1214, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, erasable programmable read-only memory (EPROM), etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1200 can also include a mass storage medium device (storage media 1216).

The computer-readable medium 1214 provides data storage mechanisms to store the device data 1204, as well as various device applications 1218 and any other types of information and/or data related to operational aspects of the computing system 1200. For example, an operating system (not shown) can be maintained as a computer application with the computer-readable medium 1214 and executed on the processor(s) 1210. The device applications 1218 may include a device manager, such as any form of a control application, a software application, a signal-processing and control module, code that is native to a particular device, a hardware abstraction layer for a particular device, and so on.

The device applications 1218 also include any system components, engines, or managers to implement screen protector presence detection. In this example, the device applications 1218 include the touch-based gesture recognition module 210 (TBD recognition module 210), the presence detection module 212, and the notification module 214 of FIG. 2.

CONCLUSION

Although techniques using, and apparatuses including, screen protector presence detection have been described in language specific to features and/or methods, it is to be understood that the subject of the appended claims is not necessarily limited to the specific features or methods described. Rather, the specific features and methods are disclosed as example implementations of screen protector presence detection.

Some examples are described below.

Example 1. A method comprising:
  detecting a touch event using a capacitive touch screen of an electronic device, the touch event representing a user interacting with the capacitive touch screen to perform a touch-based gesture; and
  detecting a presence of a screen protector on the capacitive touch screen based on touch screen data provided by the capacitive touch screen, the touch screen data including information associated with the touch event.

Example 2. The method of example 1, wherein the touch screen data is based on at least one of the following:

mutual capacitance between transmitting and receiving sensors of the capacitive touch screen; or
self-capacitance of sensors of the capacitive touch screen.

Example 3. The method of example 1 or 2, wherein the detecting the presence of the screen protector comprises:
  receiving, from multiple sensors of the capacitive touch screen, the touch screen data in a frame of the touch event;
  extracting at least one feature of the touch event from the touch screen data; and
  computing, for the frame, a confidence score indicative of the presence of the screen protector using a machine-learned model and using the at least one feature as an input to the machine-learned model.

Example 4. The method of example 3, wherein the at least one feature comprises one or more of the following:
  a signal strength associated with the touch event;
  a contact area associated with the touch event;
  a duration of the touch event; or
  a geometry associated with the touch event.

Example 5. The method of any previous example, further comprising:
  prior to detecting the presence of the screen protector, detecting that the touch event occurs within a predetermined region of the capacitive touch screen,
  wherein the predetermined region is representative of an area of the capacitive touch screen with sensors that generate substantially uniform responses.

Example 6. The method of any previous example, further comprising:
  receiving contextual information about a status of one or more parameters of the electronic device, and
  wherein the detecting the presence of the screen protector comprises detecting the presence of the screen protector based on the touch event and the contextual information.

Example 7. The method of example 6, wherein the contextual information includes a grounding condition of the electronic device.

Example 8. The method of any previous example, wherein:
  the detecting of the touch event comprises detecting multiple touch events over a first time period; and
  the detecting the presence of the screen protector comprises determining that a confidence score criterion regarding the presence of the screen protector is met over the first time period.

Example 9. The method of example 8, wherein the detecting the presence of the screen protector is further based on a number of times the presence of the screen protector has been detected during the first time period.

Example 10. The method of any previous example, further comprising:
  executing, responsive to detecting the presence of the screen protector, a notification action including at least alerting the user that the screen protector is present.

Example 11. The method of example 10, further comprising:
  determining that a current touch sensitivity threshold associated with detecting touch-based gestures is suboptimal based on the detected presence of the screen protector,
  wherein the executing of the notification action comprises executing the notification action to prompt the user to select a mode associated with a second touch sensitivity threshold that is optimal based on the detected presence of the screen protector.

Example 12. The method of any one of examples 1 to 10, further comprising:

determining that a current touch sensitivity threshold associated with detecting touch-based gestures is sub-optimal based on the detected presence of the screen protector; and automatically selecting a second touch sensitivity threshold that is optimal based on the detected presence of the screen protector.

Example 13. The method of example 11 or 12, wherein the second touch sensitivity threshold increases an effective sensitivity of the electronic device for detecting subsequent touch-based gestures.

Example 14. The method of any previous example, further comprising:

after detecting the presence of the screen protector, detecting a second touch event using the capacitive touch screen of the electronic device; and detecting an absence of the screen protector based on other touch screen data provided by the capacitive touch screen, the other touch screen data including information associated with the second touch event.

Example 15. The method of example 14, further comprising:

executing, responsive to detecting the absence of the screen protector, a second notification action including at least alerting an operator that the screen protector is absent.

Example 16. The method of example 14 or 15, further comprising:

determining that a current touch sensitivity threshold associated with detecting touch-based gestures is sub-optimal based on the detected absence of the screen protector, wherein the executing of the second notification action comprises executing the second notification action to prompt the user to select another mode associated with a first touch sensitivity threshold that is optimal based on the detected absence of the screen protector.

Example 17. The method of example 14 or 15, further comprising:

determining that a current touch sensitivity threshold associated with detecting touch-based gestures is sub-optimal based on the detected absence of the screen protector; and automatically selecting a first touch sensitivity threshold that is optimal based on the detected absence of the screen protector.

Example 18. The method of example 16 or 17, wherein the first touch sensitivity threshold decreases an effective sensitivity of the electronic device for detecting subsequent touch-based gestures.

Example 19. An apparatus comprising:

a capacitive touch screen; and a processor, the apparatus configured to perform, using the capacitive touch screen and the processor, any one of the methods of examples 1 to 18.

Example 20. A computer-readable storage medium comprising instructions that, responsive to execution by a processor, cause an electronic device to perform any one of the methods of examples 1 to 18.

What is claimed is:

1. A method comprising:

detecting a touch event using a capacitive touch screen of an electronic device, the touch event representing a user interacting with the capacitive touch screen to perform a touch-based gesture;

determining that the touch event occurs within a predetermined region of the capacitive touch screen, the predetermined region representing an area of the capacitive touch screen with sensors that generate, in an absence of the touch event, relatively uniform saturation levels compared to another area of the capacitive touch screen that is outside of the predetermined region, the predetermined region being smaller than the capacitive touch screen; and detecting a presence of a screen protector on the capacitive touch screen based on touch screen data provided by the capacitive touch screen and based on the determining that the touch event occurs within the predetermined region, the touch screen data including information associated with the touch event.

2. The method of claim 1, wherein the touch screen data is based on at least one of the following:

mutual capacitance between transmitting and receiving sensors of the capacitive touch screen; or self-capacitance of sensors of the capacitive touch screen.

3. The method of claim 1, wherein the detecting the presence of the screen protector comprises:

receiving, from multiple sensors of the capacitive touch screen, the touch screen data in a frame of the touch event;

extracting at least one feature of the touch event from the touch screen data; and computing, for the frame, a confidence score indicative of the presence of the screen protector using a machine-learned model and using the at least one feature as an input to the machine-learned model.

4. The method of claim 3, wherein the at least one feature comprises one or more of the following:

a signal strength associated with the touch event;

a contact area associated with the touch event;

a duration of the touch event; or a geometry associated with the touch event.

5. The method of claim 1, further comprising:

receiving contextual information about a status of one or more parameters of the electronic device, and wherein the detecting the presence of the screen protector comprises detecting the presence of the screen protector based on the touch event and the contextual information.

6. The method of claim 5, wherein the contextual information includes a grounding condition of the electronic device.

7. The method of claim 1, wherein:

the detecting of the touch event comprises detecting multiple touch events over a first time period; and the detecting the presence of the screen protector comprises determining that a confidence score criterion regarding the presence of the screen protector is met over the first time period.

8. The method of claim 7, wherein the detecting the presence of the screen protector is further based on a number of times the presence of the screen protector has been detected during the first time period.

9. The method of claim 1, further comprising:

executing, responsive to detecting the presence of the screen protector, a notification action including at least alerting the user that the screen protector is present.

10. The method of claim 9, further comprising:

determining that a current touch sensitivity threshold associated with detecting touch-based gestures is suboptimal based on the detected presence of the screen protector, wherein the executing of the notification action comprises executing the notification action to prompt the user to select a mode associated with a second touch sensitivity threshold that is optimal based on the detected presence of the screen protector.

11. The method of claim 1, further comprising:

determining that a current touch sensitivity threshold associated with detecting touch-based gestures is suboptimal based on the detected presence of the screen protector; and automatically selecting a second touch sensitivity threshold that is optimal based on the detected presence of the screen protector.

12. The method of claim 11, wherein the second touch sensitivity threshold increases an effective sensitivity of the electronic device for detecting subsequent touch-based gestures.

13. The method of claim 1, further comprising:

after detecting the presence of the screen protector, detecting a second touch event using the capacitive touch screen of the electronic device; and detecting an absence of the screen protector based on other touch screen data provided by the capacitive touch screen, the other touch screen data including information associated with the second touch event.

14. The method of claim 13, further comprising:

executing, responsive to detecting the absence of the screen protector, a second notification action including at least alerting an operator that the screen protector is absent.

15. The method of claim 14, further comprising:

determining that a current touch sensitivity threshold associated with detecting touch-based gestures is suboptimal based on the detected absence of the screen protector, wherein the executing of the second notification action comprises executing the second notification action to prompt the user to select another mode associated with a first touch sensitivity threshold that is optimal based on the detected absence of the screen protector.

16. The method of claim 14, further comprising:

determining that a current touch sensitivity threshold associated with detecting touch-based gestures is suboptimal based on the detected absence of the screen protector; and automatically selecting a first touch sensitivity threshold that is optimal based on the detected absence of the screen protector.

17. The method of claim 15, wherein the first touch sensitivity threshold decreases an effective sensitivity of the electronic device for detecting subsequent touch-based gestures.

18. An apparatus comprising:

a capacitive touch screen configured to generate touch screen data; and a processor configured to:

detect a touch event that represents a user interacting with the capacitive touch screen to perform a touch-based gesture;

determine that the touch event occurs within a predetermined region of the capacitive touch screen, the predetermined region representing an area of the capacitive touch screen with sensors that generate, in an absence of the touch event, relatively uniform saturation levels compared to another area of the capacitive touch screen that is outside of the predetermined region, the predetermined region being smaller than the capacitive touch screen; and detect a presence of a screen protector on the capacitive touch screen based on the touch screen data provided by the capacitive touch screen and based on the determining that the touch event occurs within the predetermined region, the touch screen data including information associated with the touch event.

19. The apparatus of claim 18, wherein the processor is configured to:

determine that a current touch sensitivity threshold associated with detecting touch-based gestures is suboptimal based on the detected presence of the screen protector; and execute a notification action to prompt the user to select a mode associated with a second touch sensitivity threshold that is optimal based on the detected presence of the screen protector.

20. A non-transitory computer-readable storage medium comprising instructions that, responsive to execution by a processor, cause an electronic device to:

detect a touch event that occurs on a capacitive touch screen of the electronic device, the touch event representing a user interacting with the capacitive touch screen to perform a touch-based gesture;

determine that the touch event occurs within a predetermined region of the capacitive touch screen, the predetermined region representing an area of the capacitive touch screen with sensors that generate, in an absence of the touch event, relatively uniform saturation levels compared to another area of the capacitive touch screen that is outside of the predetermined region, the predetermined region being smaller than the capacitive touch screen; and detect a presence of a screen protector on the capacitive touch screen based on touch screen data provided by the capacitive touch screen and based on the determining that the touch event occurs within the predetermined region, the touch screen data including information associated with the touch event.

* * * * *